UNITED STATES PATENT OFFICE.

JACOB H. SMYSER, OF PITTSBURG, PENNSYLVANIA.

IMPROVEMENT IN ROOFING COMPOSITIONS.

Specification forming part of Letters Patent No. 113,588, dated April 11, 1871; reissue No. 4,624, dated November 7, 1871.

*To all whom it may concern:*

Be it known that I, JACOB H. SMYSER, of Pittsburg, in the county of Allegheny and State of Pennsylvania, have invented certain new and useful Improvements in a Fire and Water-Proof Composition for Roofing; and I do hereby declare the following to be a full, clear, and exact description of the manner of making or compounding the same.

My invention or discovery relates to a new and useful method of utilizing waste vulcanized caoutchouc by adapting it to the purpose of a fire and water-proof roofing composition.

I am aware that methods of using crude non-vulcanized caoutchouc have been often described for the purpose mentioned; but I am not aware that vulcanized India rubber has ever been used, and my invention is independent of all such.

To make my roofing composition, I first fuse the vulcanized rubber, in a sufficiently-comminuted state, with the products of a destructive distillation or slow putrefactive change of organic matters, such as coal-tar, pine-tar, bitumens, asphaltums, or their chemical equivalents, as vehicles or solvents. This resulting product can be used, of itself, for roofing purposes. Or, after the fusion of the above I may add a salt of an alkaline, or an earthy metal, or a mixture or chemical combination of salts of the alkaline and earthy metals equivalent (about) in weight to that of the fused mixture. The proportions in which the two first-named ingredients are to be used depend entirely upon the product it is desired to obtain—that is, as regards cheapness and durability. I find that one part of vulcanized rubber to three parts of coal-tar, pine-tar, bitumen, asphaltum, or other similar equivalent vehicle or solvent, produces a desirable compound for roofing purposes. To this product may be added three or four parts of the salts of alkaline and earthy metals equivalent (about) in weight to that of the fused mixture, as above stated, which produces a cheaper roofing mixture, and which is valuable, under many circumstances, as a roof-covering, though not so much so as the vulcanized rubber compound alone. After thorough incorporation by distillation or heat the substance may be spread upon cloth, paper, or some such material, by means of brushes or suitable machinery, then sanded or dusted with iron-ore and rolled to any desired thickness.

I do not, of course, restrict myself to the above-named proportions, though they make a good product, as they may be changed or varied to suit the purpose in view.

Having thus fully described my invention, what I claim therein as new is—

1. A composition for roofing of vulcanized India rubber or caoutchouc, in connection with the products of a destructive distillation or slow putrefactive change of organic matters, such as coal-tar, pine-tar, bitumens, asphaltum, or other chemically-equivalent vehicle or solvent, substantially as described.

2. Combining or mixing with the above-mentioned vulcanized India-rubber compound a salt of an alkaline metal, or salt of an earthy metal, or a mixture or chemical combination of salts of both, substantially as and for the purpose set forth.

JACOB H. SMYSER.

Witnesses:
FRED. S. SWETT,
WM. J. STALEY.

(126)